No. 790,372. PATENTED MAY 23, 1905.
J. T. LANGFORD.
PROCESS OF MAKING CEMENT LINED METAL PIPES.
APPLICATION FILED NOV. 17, 1902.
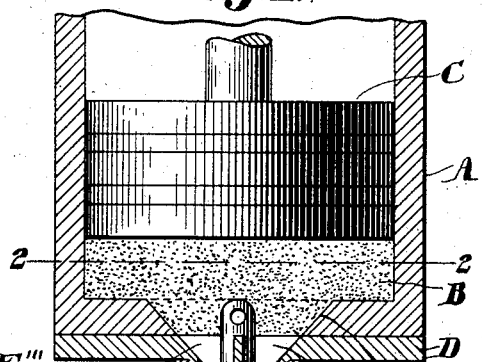
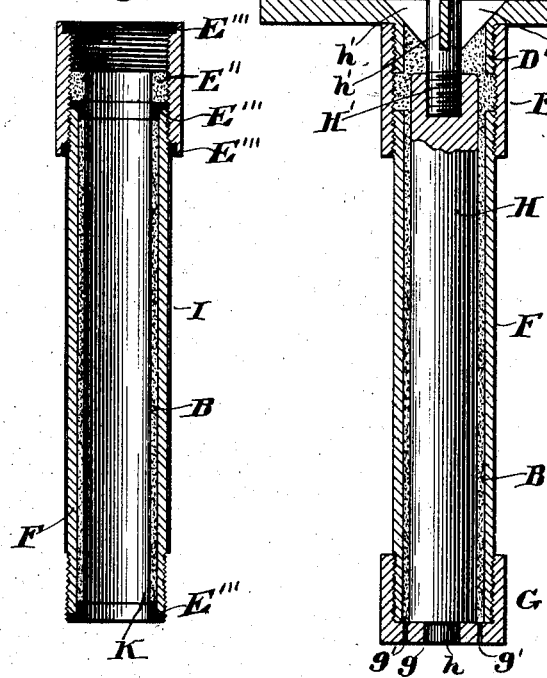
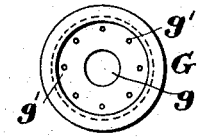
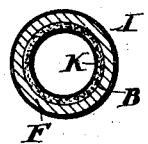
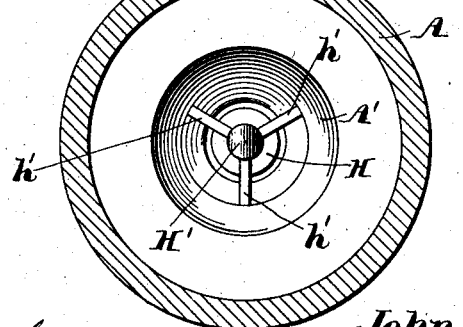
Witnesses:
Walter P. Lombard.
Nathan C. Lombard 2nd
Inventor:
John T. Langford,
by Evan Andrew
atty.

No. 790,372. Patented May 23, 1905.

UNITED STATES PATENT OFFICE.

JOHN T. LANGFORD, OF NEWTON, MASSACHUSETTS.

PROCESS OF MAKING CEMENT-LINED METAL PIPES.

SPECIFICATION forming part of Letters Patent No. 790,372, dated May 23, 1905.

Application filed November 17, 1902. Serial No. 131,614.

*To all whom it may concern:*

Be it known that I, JOHN T. LANGFORD, a citizen of the United States, and a resident of Newton, in the county of Middlesex and State of Massachusetts, have invented certain new and useful Improvements in Processes of Making Cement-Lined Metal Pipes, of which the following is a specification.

My invention relates to a process or method of lining metal pipes with a lining of cement or its equivalent and lining pipe couplings or hubs (by which I mean a connecting medium for joining together two pipes) with an abutment of cement or its equivalent.

Prior to my invention the cement lining of pipes was loosely and unevenly applied and was easily broken in transportation. For this and other reasons such cement-lined pipes have not been merchantable and their field of use has been very limited, being practically restricted to those occasions and circumstances where pipe can be lined at or near the place at which they are to be used.

For reasons above referred to it has been found impracticable by methods of lining in use prior to my invention to provide cement-lined pipes capable of sustaining the requirements of a water-pipe for a public water-supply.

Notwithstanding cement-lined pipe has proven to be the most healthful conduit through which water for domestic use may be conveyed, such pipes for the reasons stated had not prior to my invention obtained general public approval and their use was restricted within the narrow limits mentioned. The lining within such pipes lacks density, durability, and the strength to stand transportation without injury.

By my invention cement-lined pipes may be manufactured by which all the objections existing to previously-known cement-lined pipes are obviated, and pipe lined with cement that combines the attributes of purity, durability, and strength is afforded.

My invention, as will hereinafter appear, resides in the new method or process of lining pipes with cement or equivalent and of lining pipe connections, such as couplings or hubs, with a cement or equivalent abutment for the ends of the pipes to be joined together.

In the following specification and claims the word "cement" is intended to include cement or its equivalent.

According to my invention the pipe is preliminarily prepared to receive a cement lining. A core is then introduced thereinto, leaving a space between the interior wall of the pipe and the surface of the core. A suitable cement is then forced under pressure through the open end of the pipe into the space between the core and pipe, which space is hereinafter termed the "lining-space." In this way the cement is caused to firmly adhere to the interior wall of the pipe and be solidly filled and densely compacted in said lining-space, resulting in a cement lining of great density and purity and which effectively protects the pipe from oxidation, is durable, of great strength, and which may be transported great distances for use without injury. Such is the character of my improved process in its broader aspect. More specifically, the process consists in connecting one end of the pipe to a lining-sleeve having a nozzle, inserting a core within the pipe, supported from the nozzle centrally in the pipe to provide a lining-space, attaching to the pipe a lining-base having air-passages through which the air in the lining-space may escape, connecting to the lining-nozzle a reservoir containing a cement mixture, and applying pressure to force the cement from the reservoir through the open end of the pipe into the lining-space, filling said space and compacting the cement therein, after which the several instrumentalities are removed, leaving the pipe with a smooth solid lining firmly compressed thereto.

In lining pipe-connecting elements, such as couplings or hubs, with a cement abutment the connecting element is preliminarily prepared to receive and retain the cement. Then, preferably, a core is introduced thereinto and a lining-base is connected therewith, leaving a space within the connecting element between the core and the wall of said element to receive the cement, and a suitable cement is then forced into such space, resulting in the formation of an elastic or yielding cement abutment or cushion within and firmly attached to the coupling element, against which the ends of connected pipes engage, whereby a tight joint may be secured without the use of serrated pipe or other tools which break the exterior coating of the pipe and hasten the decomposition of the pipe and pipe-connecting elements.

The pipe and pipe-connecting elements when completed according to my process will have a smooth solid lining of large internal diameter, dense, strong, impervious to moisture, and resistant to impurities and to forces that destroy cement and the metal of the pipe and possessing strength to safely stand transportation and the rough handling incident thereto. A pipe lined according to my invention affords a pure and durable conduit especially adapted for conveying and maintaining the purity of water for domestic use.

In carrying my invention into practice I make use, preferably, of instrumentalities such as shown in the accompanying drawings, in which drawings are illustrated the various steps of the process; but to the utilization of these or other particular instrumentalities my invention is not restricted.

In the accompanying drawings, Figure 1 is a central longitudinal sectional view of the preferred apparatus for lining screw-threaded pipe with a pipe to be lined connected thereto. Fig. 2 is a cross-section on the line 2 2, Fig. 1. Fig. 3 is a detail top plan view showing the lining-base and illustrating the means for escape of air from the lining-space. Fig. 4 is a central longitudinal sectional view of a lined pipe and a pipe-connecting element, such as a hub or coupling lined with an abutment according to my invention. Fig. 5 is a cross-section of the pipe shown in Fig. 4.

In describing my improved method or process reference will be had to the accompanying drawings and to the letters of reference thereon.

In said drawings the reference letter A designates a reservoir containing the cement compound, (lettered B.)

C is a piston arranged to move in the reservoir A and to which external power of any suitable description is applied in any suitable manner to force the cement compound into the lining-space within the pipe or pipe-connecting element.

The reservoir A is provided with an opening at its lower end, beneath which is arranged a centrally-perforated lining-nozzle D, having an external screw-thread D'.

The reference-letter E designates a lining-sleeve constructed to be detachably secured to the lining-nozzle, to which sleeve one end of the pipe is adapted to be connected and by which it is sustained in position during the lining operation.

The reference-letter G designates what I term a "lining-base," which is fitted to the lower end of the pipe to be lined and which is provided with a series of small openings $g'$ to permit escape of air from the lining-space within the pipe or pipe-connecting element.

The reference-letter H designates a core which is introduced into the pipe, leaving a space between itself and the interior wall of the pipe or pipe-connecting element into which the cement lining is to be forced, and which space, as before stated, I term a "lining-space."

The reference-letter F designates the pipe to be lined.

In practicing my improved method or process of lining pipe the lining-sleeve E is attached to the nozzle D, and one end of the pipe to be lined is in turn connected to said sleeve, by which it is supported during the lining operation. The lining-base G is then attached to the lower end of the pipe and the core is introduced into the pipe, being centered and supported therein by means of the centering-rod H', having wings $h'$, that take their bearings within the nozzle D. The lower end of the core may, if desired, be reduced, as illustrated, and this end of the core rests in the seat $g$ in the lining-base G, whereby it is centered at its lower end. The reservoir A is then connected to the lining-nozzle and supplied with the cement mixture. The piston is then caused to force the cement from the reservoir through the nozzle and the lining-sleeve through the open end of the pipe into the lining-space between the core and the interior wall of the pipe. During this operation the air in the lining-space escapes through the ventilating-perforations $g'$ in the lining-base. The degree of pressure exerted in this action may be varied. I have found a pressure ranging between five and ten hundred pounds to the square inch suitable, but I do not restrict my invention to any particular degree of pressure. When the pipe has thus been lined, the reservoir is removed, the core withdrawn, and the pipe disconnected from the lining-sleeve and lining-base. The positive forcing of the cement mixture under pressure into the lining-space within the pipe, solidly filling and closely compacted in said space, results in a smooth, dense, and strong lining which is firmly compressed to or connected with the interior surface of the pipe. The same generic process is practiced when a pipe-connecting element, such as a coupling or hub, is to be lined with an abutment for the purpose heretofore explained, and preferably with the assistance of instrumentalities such as shown in the drawings. The lining-sleeve referred to, however, is not needful in this operation. The pipe-connecting element may be attached directly to the nozzle, and a suitable lining-base inserted into the lower end of the coupling element and made to engage with the interior screw-threads of the connecting element. When the coupling or hub has been thus connected, a core is introduced thereinto, and cement composition of a character suitable for the purpose is forced through the nozzle into the lining-space within said element, filling the same and forming an abutment therein, which is designated by the reference-letter E″, Fig. 4.

In Fig. 4 of the drawings the completed lined pipe and a connecting element, such as a coupling or hub, are illustrated. In this figure I have also shown packing-rings E‴. These packing-rings may or may not be used, according to the necessities of particular situations. My present invention does not concern the same and is not in any sense limited thereto. The reference-letters I and K in this figure of the drawings indicate coatings applied to the cement lining and the metal pipe. Such coatings are desirable in the completed commercial articles; but the same are not concerned in my present invention, pipe having such coatings being disclosed and claimed in my Letters Patent No. 724,892, dated April 7, 1903, and they are illustrated herein merely for the purpose of showing a complete finished commercial article.

It will be understood, of course, that the apparatus or instrumentalities shown and described are illustrative merely, and that my invention resides in the method or process and is not restricted to any particular apparatus or instrumentalities for carrying it into effect.

Having thus described my invention, what I claim is—

1. The herein-described method or process of lining metal pipe, consisting in centering and supporting a core within the pipe, leaving a lining-space between said core and pipe, forcing a lining of cement, under pressure, through the open end of the pipe into said space, whereby it is compacted and compressed therein, and then removing the core.

2. The herein-described method or process of lining metal pipe, consisting in centering and supporting a core within a pipe-connecting element, leaving a lining-space between the core and the pipe-connecting element, forcing a lining of cement under pressure through the open end of the pipe-connecting element into said space, whereby it is compacted and compressed therein, and then removing the core, substantially in the manner and for the purpose set forth.

3. The herein-described method or process of lining metal pipe, consisting in inserting a core within the pipe, connecting said pipe and core in coöperative relation to the cement-reservoir, then forcing cement, under pressure, from the reservoir through the open end of the pipe into the space between the core and the pipe, whereby the cement is compacted and compressed in said space, disconnecting the core and pipe from the reservoir, and finally removing the core from the pipe, substantially as described.

4. The herein-described method or process of lining metal pipe, consisting in inserting a core within a pipe-connecting element, and connecting said pipe-connecting element and the core in coöperative relation to a cement-reservoir, then forcing cement, under pressure, from the reservoir through the open end of the pipe-connecting element into the space between the core and the pipe-connecting element, whereby the cement is compacted and compressed in said space, disconnecting the core and the pipe-connecting element from the reservoir, and finally removing the core from the pipe-connecting element, substantially as described.

In testimony whereof I have affixed my signature in presence of two witnesses.

JOHN T. LANGFORD.

Witnesses:
 ALBAN ANDRÉN,
 FRANK J. STILES.